United States Patent [19]

Andrasko, Jr.

[11] Patent Number: 4,653,714
[45] Date of Patent: Mar. 31, 1987

[54] HAND RAIL

[76] Inventor: John Andrasko, Jr., 4745 Palo Verde Dr., Boynton Beach, Fla. 33436

[21] Appl. No.: 797,622

[22] Filed: Nov. 13, 1985

[51] Int. Cl.⁴ .............................................. A47H 1/14
[52] U.S. Cl. .................................... 248/251; 248/264; 211/105.1; 403/378; 403/192
[58] Field of Search .............................. 248/251, 264; 211/105.1, 123; 403/362, 378, 241, 192, 26, 344; 464/184

[56] References Cited

U.S. PATENT DOCUMENTS

| | | | |
|---|---|---|---|
| 328,562 | 10/1885 | Beckman | 248/264 |
| 438,109 | 10/1890 | Jones | 248/264 |
| 455,435 | 7/1891 | Durst | 248/264 |
| 544,166 | 8/1895 | Gregory | 248/264 |
| 915,675 | 3/1909 | Hornberger | 403/192 |
| 1,714,719 | 5/1929 | Mestel et al. | 211/105.1 X |
| 1,940,888 | 12/1933 | Smith | 248/251 X |
| 1,962,739 | 6/1934 | Hoegger | 248/251 X |
| 2,215,331 | 9/1940 | Marsh | 248/251 |
| 2,657,894 | 11/1953 | Sklenar | 248/251 X |
| 2,847,177 | 8/1958 | Ronan | 248/251 X |
| 2,886,278 | 5/1959 | Opie | 248/251 |
| 3,260,021 | 7/1966 | Katz | 211/105.1 X |
| 3,749,344 | 7/1973 | Racina | 248/218.4 |
| 4,405,108 | 9/1983 | Muirhead | 248/221.2 X |
| 4,436,273 | 3/1984 | Yuda et al. | 248/DIG. 9 |

FOREIGN PATENT DOCUMENTS

| | | |
|---|---|---|
| 29555 | of 1914 United Kingdom | 248/264 |
| 458966 | 12/1936 United Kingdom | 248/264 |

Primary Examiner—Ramon S. Britts
Assistant Examiner—Blair M. Johnson
Attorney, Agent, or Firm—Steele, Gould & Fried

[57] ABSTRACT

A hand rail assembly for installation between opposing surfaces includes rod structure and rod support structure adapted to be mounted on the opposing surfaces. The rod support structure is preferably slidably engageable to the surface and preferably includes a body having on a side at least one projection adapted to be received by a complementary depression in the surface so as to prevent movement of the rod support structure along the surface. Rod positioning structure on the opposite side of the body positions the rod structure between the rod support structure so as to prevent disengagement of the rod support structure from the surface while permitting sideways insertion of the rod structure. Locking structure for locking the rod structure to the rod support structure is also provided. The rod structure is preferably of a length substantially that between the respective rod support structure such that the rod support structure cannot be removed without first removing the rod structure.

9 Claims, 4 Drawing Figures

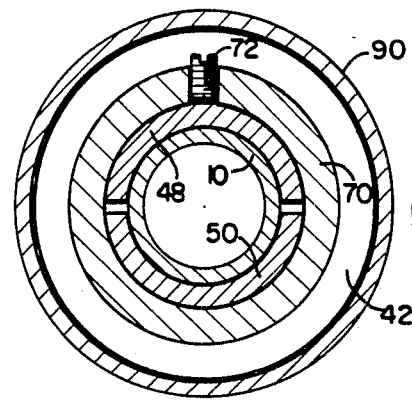
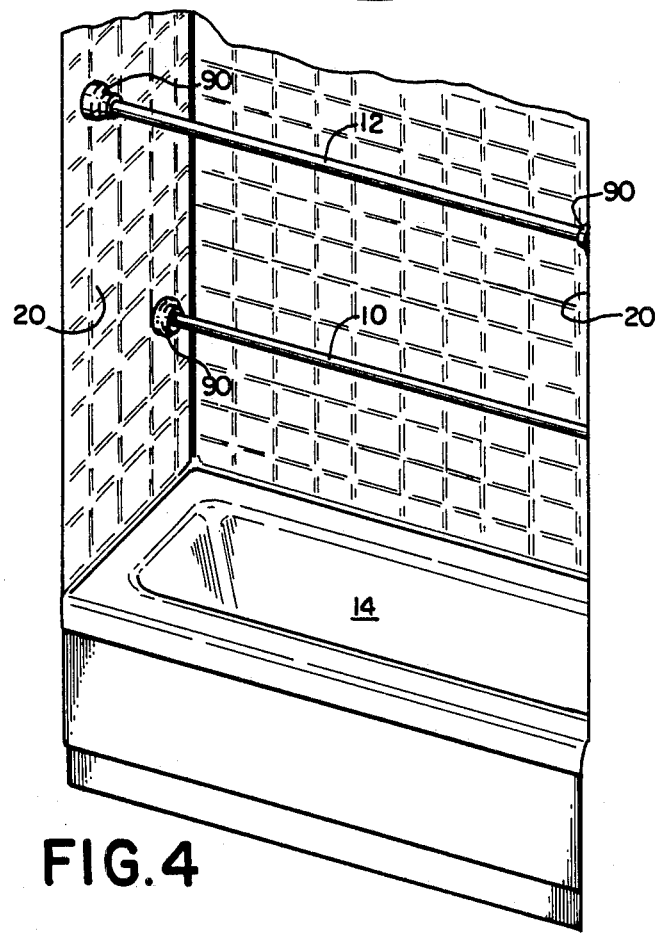

HAND RAIL

BACKGROUND OF THE INVENTION

1. Field of the Invention

This invention relates generally to a rail for installation between opposing surfaces, and particularly to a rail adaptable for easy installation in bathtub and shower stalls.

2. Description of the Prior Art

Every year a number of people are injured in slips and falls in bathtub and shower stalls. This is due not only to the slick nature of the tile and porcelain floor surfaces when wet and soapy, but also to the lack of a firm handhold in most every bathtub and shower stall. Attempts have been made to provide hand rails for bathtub and shower stalls, but these have usually resulted in products which are either unsafe to use or expensive to manufacture and install.

It would be desirable to provide a hand rail assembly for bathtub and shower stalls which is easily yet securely mounted in most any bathtub or shower stall. The hand rail should be strong enough to support the weight of average or heavier persons. The hand rail should also be resistant to deterioration in the humid environment of the bathroom. The hand rail should be capable of easy and inexpensive installation, while insuring safety. It would also be desirable if such a hand rail could be manufactured with relatively few parts, and thus relatively inexpensively. The hand rail would preferably be aesthetically pleasing so as not to detract from the bathroom decor.

Several patents have been directed to apparatus for mounting poles or rods for various purposes. Mercereau, U.S. Pat. No. 278,721 discloses a mounting for a curtain pole in which two end brackets are provided, one with a circular end piece B and another end piece C being formed similarly to piece B but made in two sections. The upper section is attached to the end of the pole A and the lower section is attached to the side D of the window casing. The curtain pole thus mounted presents an even appearance with both joints looking substantially the same.

Gregory, U.S. Pat. No. 544,166, shows a holder for a curtain pole in which a socket B receives on end of the pole and a socket C receives the other end of the pole. A locking-sleeve G with locking grooves d cooperates with the socket C amd studs e to secure the pole to the socket C.

Grossman, U.S. Pat. No. 3,291,430 discloses a cornice mounting for shower curtains in which a bracket 13 is mounted to the wall by suitable means such as screws. A bar 11 is positioned such that its ends are set up against the underface of a bracket leg 24 of the bracket 13. An anchoring member 12 is shifted so as to overlap the legs and the bar 11. Tightening a set screw 32 fixes the unit in position.

Racina, U.S. Pat. No. 3,749,344 discloses a jump cup for holding a cross bar for horse jumping or the like in which a dowel 120 secures a bracket 50 to a support post. The bracket 50 includes a curved plate 20 which receives an end of the cross bar.

Meagher, U.S. Pat. No. 1,752,683 discloses a socket block for poles, especially those that are used in supporting tobacco leaves that are hung up to dry or cure. The block 3 has a socket opening in the side thereof extending to the top. A lower portion of the socket has a concave semi-cylindrical shape. The socket is adapted to receive a pole through the top thereof by a twisting movement around either side of the opening. A twisting movement around the shoulder causes the pole to be received in a lower concave of the opening.

Vanderveld, U.S. Pat. No. 2,291,177 discloses a universal mounting for hang rods which includes bracket 3 terminating in an arch-shaped section 4. A cylindrical ring 5 has a continuous annular inwardly extending flange 6 which engages an end of a tubular hang rod 8. An inclined tapered flange 7 of the ring 5 engages the section 4 of the flange 3.

Mestel, et al., U.S. Pat. No. 1,714,719 discloses a bracket for supporting a hanger rod of a display fixture. A supporting bracket 7 has a supporting pin 18 which is adapted to be engaged in openings 11 of a supporting strip.

Koering, U.S. Pat. No. 1,721,305 discloses a towel bar which is mounted within brackets, a spring member 7 retaining the bar within the bracket.

SUMMARY OF THE INVENTION

It is an object of the invention to provide a hand rail assembly for bathtub and shower stalls which will safely support the weight of most bathers.

It is another object of the invention to provide a hand rail assembly for bathtub and shower stalls which is easily and inexpensively installed.

It is yet another object of the invention to provide a hand rail assembly for bathtub and shower stalls which is relatively inexpensively manufactured.

It is another object of the invention to provide a hand rail assembly for bathtub and shower stalls which will not deteriorate in the bathroom environment.

These and other objects are accomplished by a hand rail assembly for installation between opposing surfaces in bathtub and shower stalls with rod structure and rod support structure adapted to be mounted on the opposing surfaces. The rod support structure is preferably slideably engageable to the surfaces. The rod support structure preferably includes a body having on a side at least one projection adapted to be slidably received by a complimentary depression in the surface so as to support the rod support structure against movement along the surface. Rod positioning structure on the opposite side of the rod support structure positions the rod structure while permitting sideways insertion of the rod structure. Locking structure is provided for locking the rod structure to the rod support structure.

The rod structure is preferably of a length substantially that between the respective rod support structure such that the rod support structure cannot be removed without first removing the rod structure. If the rod structure is not of sufficient length, additional structure can be provided to effectively wedge the rod structure between the rod support structure.

The rod positioning structure preferably comprises an upwardly opening cup of a cross section complimentary to that of the rod structure which it is to receive. A cover cup, also preferably of complimentary cross section to the rod structure, is adapted to be placed over the rod structure. The locking structure preferably comprises a fitting adapted to be placed over the rod structure, the rod positioning structure, and the cover structure and to be securely locked in place.

The body is preferably a plate member and has projection structure preferably in the form of a dowel or dowels. In the preferred embodiment, a large central dowel provides much of the support for the body while a smaller, off-center dowel prevents rotation of the body.

A cup-like escutcheon preferably fits over an end of the rod structure, the rod positioning structure, the cover structure, and the locking structure, and is secured by fastening means. The escutcheon helps to keep water from the juncture of the rod support structure with the surface and also presents an even and aesthetically pleasing appearance.

BRIEF DESCRIPTION OF THE DRAWINGS

These are shown in the drawings forms and embodiments presently preferred it being understood, however, that the invention is not limited to the precise arrangements and instrumentalities shown.

FIG. 3 is a cross section taken along the line 3—3 in FIG. 2.

FIG. 4 is a perspective view.

DESCRIPTION OF THE PREFERRED EMBODIMENTS

Figure 1:
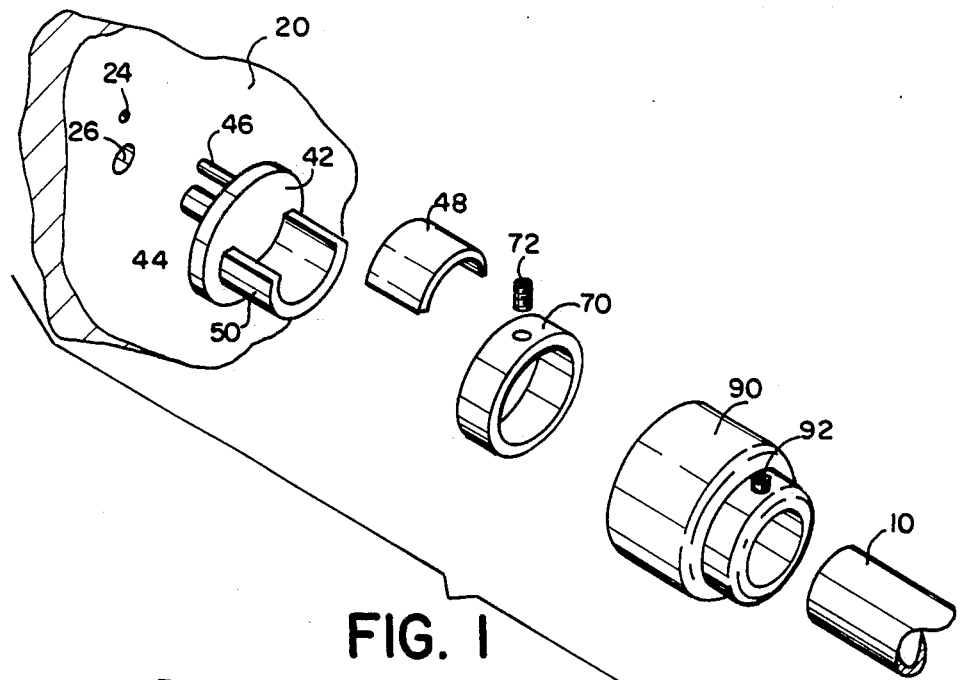
FIG. 1 is an exploded perspective view of a hand rail according to the present invention.
Figure 2:
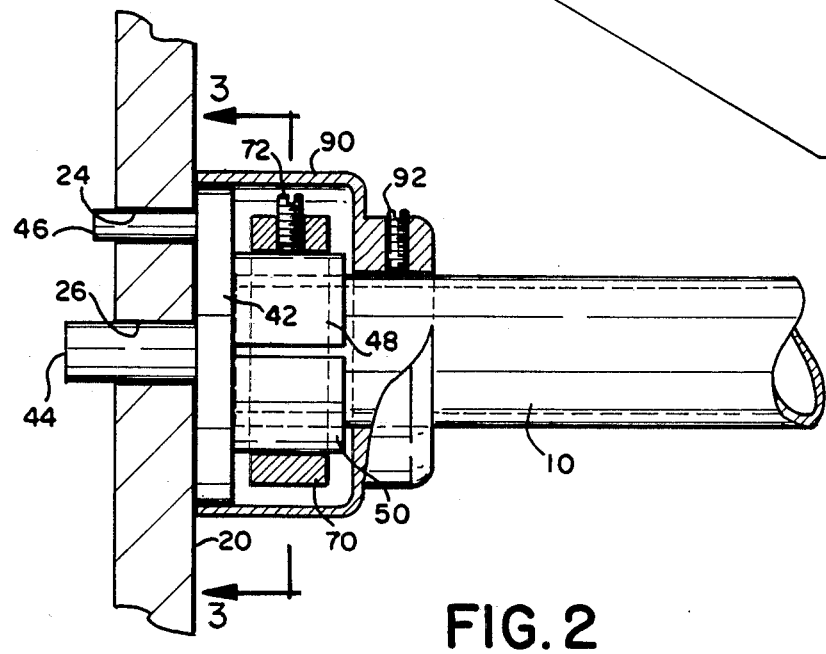
FIG. 2 is a side elevation partially broken away and partially in section.

Referring to FIGS. 1-4, there is shown a hand rail according to the present invention as shown by means of which rod structure 10 is securely mounted above bathtub and shower stall 14 between facing wall surfaces 20. The wall surfaces 20 bear depressions or holes 24, 26 which receive rod support structure to support the rod structure 10. While the present embodiment will be described with reference to installation in bathtub and shower stalls, it would be apparent to one skilled in the art that the invention could be utilized wherever a rail could be mounted between facing surfaces to prevent slips and falls. Two rod support structures would be necessary to practice the invention, one mounted on each facing wall surface 20, preferably mounted directly opposite to one another such that the rod structure 10 suspended therebetween will be level to the tub 14 and parallel to the wall adjacent the rod structure 10. The rod support structure includes a body 42 preferably provided as a plate member so as to evenly rest against the wall 20.

The rod support structures are provided with engagement structure for mounting the rod support structures on the surfaces. The engagement structure is preferably of the type which simply slides into place without screwing or other manipulations. Slidable engagement is made possible by the invention because the engagement structure is necessary only to prevent movement of the rod support structure parallel to the surfaces and not normal to the surfaces. The engagement structure can then be projections on the support structure which slides into depressions on the surfaces, projections on the surfaces which slide into depressions in the rod support structures, pins which slide through apertures in the rod support structure and into depressions in the surfaces, or other configurations.

The body 42 preferably has on one side at least one projection. In the present embodiment, two projections 44 and 46 are provided in dowel shapes. A large diameter dowel-shaped projection 44 can be located at the center of the body 42 and is received in the wall 20 by the depression 26 which is complimentary in shape. The central, large diameter dowel 44 would provide most of the support for the body 42. A smaller diameter dowel-shaped projection 46 would be received by a complimentary depression 24. The smaller diameter dowel-shaped projection 46 would provide resistance to rotation and would also provide some support for the body 42 in addition to the large diameter dowel-shaped projection 44.

It is possible of course to otherwise shape the projections 44 and 46, and to provide fewer or more projections. The dowel-shape works well because the circular depressions 24 and 26 are easily formed by common drill bits. It will be appreciated that unconventional shapes would require more difficult routing techniques and would correspondingly complicate the installation process.

The side of the body 42 opposite the wall surface 20 bears rod positioning structure which supports the rod structure and at the same time permits installation of the rod structure 10 from a direction perpendicular to the final resting axis of the rod structure 10. In this manner the rod structure 10 can be slipped into place on the opposing rod positioning structures after each rod support structure has been secured to the walls 20. It is preferable that the rod positioning structure does not completely surround the rod structure 10 so that the rod structure 10 can be sideways inserted into the rod positioning. The rod positioning structure is preferably provided as an upwardly opening cup member 50 with a cross section complimentary to that of the rod structure 10, here cylindrical, such that the rod structure rests snugly in the cup member 50.

It is desirable to provide a cover cup 48 which is also of a cross section complimentary to the rod structure 10 and which can be placed over the rod structure 10 to substantially completely surround it. Locking structure is provided to secure the end of the rod structure 10 resting in the rod positioning structure 50. It the rod structure 10 is cylindrical, the rod positioning structure 50 and cover cup 48 will be cylindrical or semi-cylindrical and the locking structure can be conveniently provided as a cylindrical collar 70 which slips over the rod positioning structure and cover cup 48, and thus the end of the rod structure 10, to hold the joint in place. Suitable locking means such as set screws 72, securely locks the joint together.

It is desirable to provide a cover for the joint to keep water spray from the joint, to cover the exposure of any corners or screws to prevent cuts or scratches, and to present an even and aesthetically pleasing appearance. An escutcheon is conveniently provided as a cylindrical cup member 90 having a bottled-down neck portion to snugly receive the rod structure 10. Suitable fastening means such as the set screw 92 secures the escutcheon in place. The escutcheon 90 fits over the body 42, the rod positioning structure 50 and the end of the rod structure 10, the cover cup 48, and the collar 70.

It will be apreciated that other shapes are possible for the rod structure 10, for example a square-shaped cross section. In this case the rod retaining structure would be of a complimentary cross section, as would cover cup 48. The collar 70 would correspondingly also be of a square shape to secure the joint together. The neck of the escutcheon 90 would also be square-shaped to snugly receive the rod structure 10.

The dimensions of the apparatus of the present invention are not relevant in so far as thicknesses and the like are suitable for the chosen material to provide the requisite strength. By way of example and not to be considered in any way limiting, the rod structure 10 may be provided as a tubular member of 1⅛" outside diameter and ⅛" thickness. The body 42 is conveniently provided as a disk-shaped plate member 1 15/16" in diameter and 3/16" thick. The large diameter dowel 44 can be 11/32" in diameter and ¾" in length. The small diameter dowel can be 3/16" in diameter and ⅝" in length. The rod positioning structure 50 can be a semi-circular member ⅛" thick and with an inside radius of curvature of approximately 9/16" and a length of 13/16". The cover member 48 might also be of semi-circular shape and ⅛" thick, with an inside radius of curvature of approximately 9/16" and a length of ¾". The set screws 72, 92 would preferably be ¼" in diameter. The escutcheon 90 would preferably have an inside diameter large enough to slip securely over the edges of the body 42, and accordingly in this embodiment would have an inside diameter of approximately 2". The bottle-down neck of the escutcheon 90 should have an inside diameter sufficient to snugly receive the rod structure 10 and in this embodiment would have an inside diameter of 1 5/32". The collar 70 would be a cylindrical member with an inside diameter of 1 7/16", a thickness of ¼", and a length of ¾".

Materials suitable for the construction of a hand rail according to the present invention would be apparent to one of ordinary skill in the art but should preferably satisfy the requiremens of strength, resistance to deterioration in a humid environment, low cost, and ease of manufacture. It is also desirable that visible components be fashioned of a material which is also aesthetically pleasing. Suitable materials would include die cast zinc or nylon. The rod structure is conveniently provided from stainless steel. The escutcheon member would preferably be of die cast zinc with a nickel finish for a pleasant appearance.

Installation of a hand rail according to the present invention is easily accomplished. A common wall in bathtub and shower stalls would include a ¼" tile surface over ½" greenboard. The installer would first drill a suitable set of holes complimentary to diameter the dowel-shaped projections 44, 46 and of corresponding depth. The installer would drill another set of holes on the opposing wall. The body portion 42 would be mounted to the wall by insertion of the dowel-like portions 44, 46, which may be accompanied by a polyseam caulking to further prevent seepage of water into the wall along with the escutcheon 90. The rod structure 10 would then be placed in position, each end resting in a rod positioning portion 50 of the opposing rod support structure with the collars 70 and escutcheon 90 thereon. The cover cups 48 would then be placed over the ends of the rod structure 10, after which the collar 70 would be slid into place and locked down by set screw 72. The escutcheon 90 may then be positioned over the joint and secured by set screw 92.

The length of the rod structure 10 should be selected such that its ends lie closely adjacent the body portion 42. In this manner, once the rod structure 10 has been set in place the rod support structure is prevented from movement out of each opposing wall 20. A tightly interconnected joint results which may safely be used by bathers without fear of the supporting structure coming loose from the walls 20.

In effect, the rod structure serves two distinct purposes or functions. One function is to support bathers. The other function is to securely "lock" the support structure in place, despite the absence of conventional screw bolts or other kinds of anchors normally used in such circumstances. The rod thus requires a certain rigidity to avoid being flexed out of the support structure. It is also therefore preferably to make the rod as long as possible, yet still able to just slip freely into place. It is this dual function which substantially sets the invention apart from the prior art, it being appreciated that the "load" of a bather so far exceeds that of a curtain rod, or the like, as to present altogether different problems to those skilled in the art. If for some reason the rod structure 10 at hand is not of sufficient length to prevent removal of the rod support structure out of each opposing wall 20 it would be possible to provide additional structure which would substantially fill the void between the ends of the rod and the rod support structure and provide the necessary snug fit. This structure could be a series of spacer discs insertable in the rod positioning structure 50 between the ends of the rod structure 10 and the body portion 42.

The hand rail according to the invention is preferably positioned a short distance above the top of the bathtub 14, or approximately at waist height in the bathtub or shower stall when standing. The invention may assist both entry and exit from the bathtub or shower stall. The hand rail of the invention also provides a firm handhold while bathing, for example, when scrubbing oneself or to assist movement in the bathtub or shower stall. The hand rail is preferably positioned a short distance out and parallel to its adjacent wall to allow the hand to reach behind the hand rail 10. It may also be desirable to some bathers, especially in a bathtub, to have an additional hand rail 12 positioned above the front of the tub and at or slightly above head height. This rail may be used to steady oneself, in addition to the hand rail 10, in exiting or entering the bathtub. It will be further appreciated that the rod can be oriented vertically between walls equivalent to floor and ceiling surface members This invention may be embodied in other forms without departing from the spirit or essential attributes thereof, and accordingly, reference should be made to the appended claims rather than the foregoing specification, as indicating the scope of the invention.

I claim:

1. A hand rail assembly for use in a space between opposing surfaces, the assembly comprising:
   substantially rigid rod means having a cross sectional perimeter and adapted to be grasped as a hand rail;
   rod support means for each end of the rod means, mounted opposite one another on the opposing surfaces, each of the rod support means having affixed on one side at least one surface engagement projection for engaging a complimentary depression in the surface to prevent movement of the rod support means along the surface;
   each rod support means having on an opposite side from the surface engagement projections rigid upwardly opening channel means positively positioning the rod means between the rod support means;
   cover cup means placed over the rod means presenting with said channel means a contact surface said contact surface engaging less than said perimeter of said rod means; and,
   clamping fitting means fitting around the rod means, channel means, and cover cup means and providing a positive clamping action therebetween, whereby the ends of the rod means are clamped to the rod support means, the rod means locks the rod support means and the projections in place in the complimentary depressions, and the rod support means enable the rod means to function as a hand rail.

2. The hand rail assembly of claim 1, wherein at least two projections are located on the rod support means, whereby rotation of the rod support means about any of the projections is restricted.

3. The hand rail assembly of claim 1, wherein the projections are slidably engageable with the dpressions.

4. The hand rail assembly of claim 2, wherein the projections are dowel-shaped.

5. The hand rail assembly of claim 4, wherein a large diameter dowel-shaped projection is centrally located on the rod support means, and at least one smaller diameter dowel-shaped projection is located off of center, the smaller diameter dowel-shaped projection preventing rotation of the rod support means about the large diameter projection.

6. The hand rail assembly of claim 1, wherein said rod means is circular in cross section, said rod positioning means and said cover cup means are substantially hemispherical in cross section, and said clamping fitting means is annular in cross section.

7. The hand rail assembly of claim 1, wherein said clamping fitting means comprises means for applying positive pressure to at least one of said channel means and said cover cup means.

8. The hand rail assembly of claim 1, wherein said means for applying positive pressure comprises a locking screw tightly engaging the clamping fitting to the rod means and to the support means.

9. The hand rail assembly of claim 1, further comprising a cup-like escutcheon fitting over the rod means and the support means.

* * * * *